United States Patent [19]
Tuggle

[11] Patent Number: 5,771,582
[45] Date of Patent: Jun. 30, 1998

[54] APPARATUS FOR CARRYING SPARE LINE SPOOL ON FLEXIBLE LINE TRIMMER

[75] Inventor: Lloyd H. Tuggle, Shreveport, La.

[73] Assignee: WCI Outdoor Products, Inc., Cleveland, Ohio

[21] Appl. No.: 690,194

[22] Filed: Jul. 26, 1996

[51] Int. Cl.[6] .............................. A01G 3/06; A01D 50/00
[52] U.S. Cl. ................................... 30/125; 30/276; 43/25
[58] Field of Search ........................... 30/276, 125, 123; 56/127; 43/25

[56] References Cited

U.S. PATENT DOCUMENTS

| | | |
|---|---|---|
| 3,708,967 | 1/1973 | Geist et al. . |
| 4,104,797 | 8/1978 | Ballas . |
| 4,176,508 | 12/1979 | Baumann et al. ........................ 30/276 |
| 4,177,561 | 12/1979 | Ballas . |
| 4,205,439 | 6/1980 | Sweet . |
| 4,211,004 | 7/1980 | Woods . |
| 4,235,068 | 11/1980 | Comer . |
| 4,338,719 | 7/1982 | Burkholder ............................... 30/276 |
| 4,369,577 | 1/1983 | Gise et al. ................................ 30/276 |
| 5,513,463 | 5/1996 | Drinkwater ................................. 43/25 |

*Primary Examiner*—Douglas D. Watts
*Attorney, Agent, or Firm*—Marc A. Hubbard

[57] ABSTRACT

A flexible line trimmer having a rotating cutting head using a spool of flexible trimming line to form a cutting element is provided with a spare spool of cutting line, stored in various locations on the flexible line trimmer, available to replace the spool of trimming line after it is depleted.

15 Claims, 6 Drawing Sheets

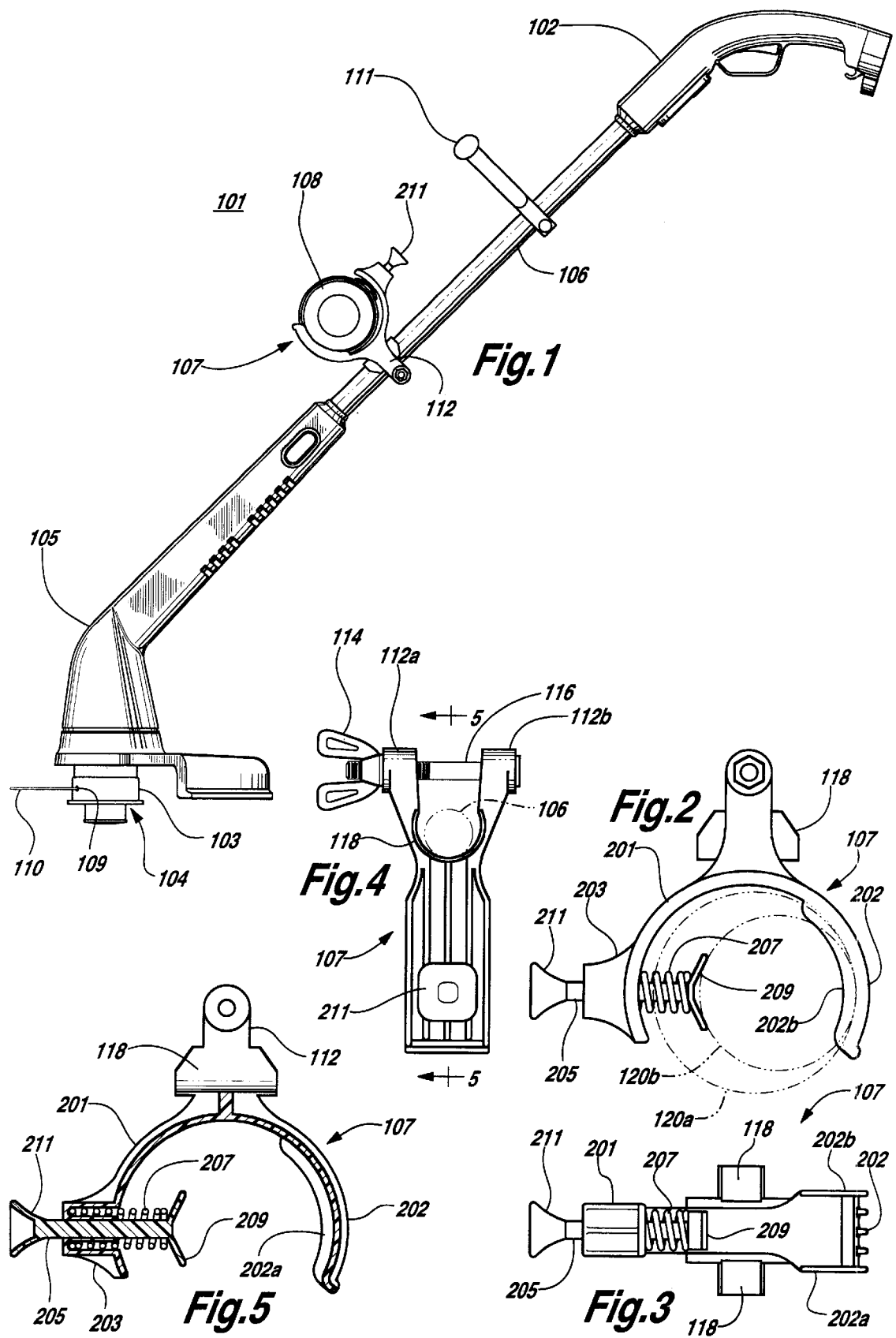

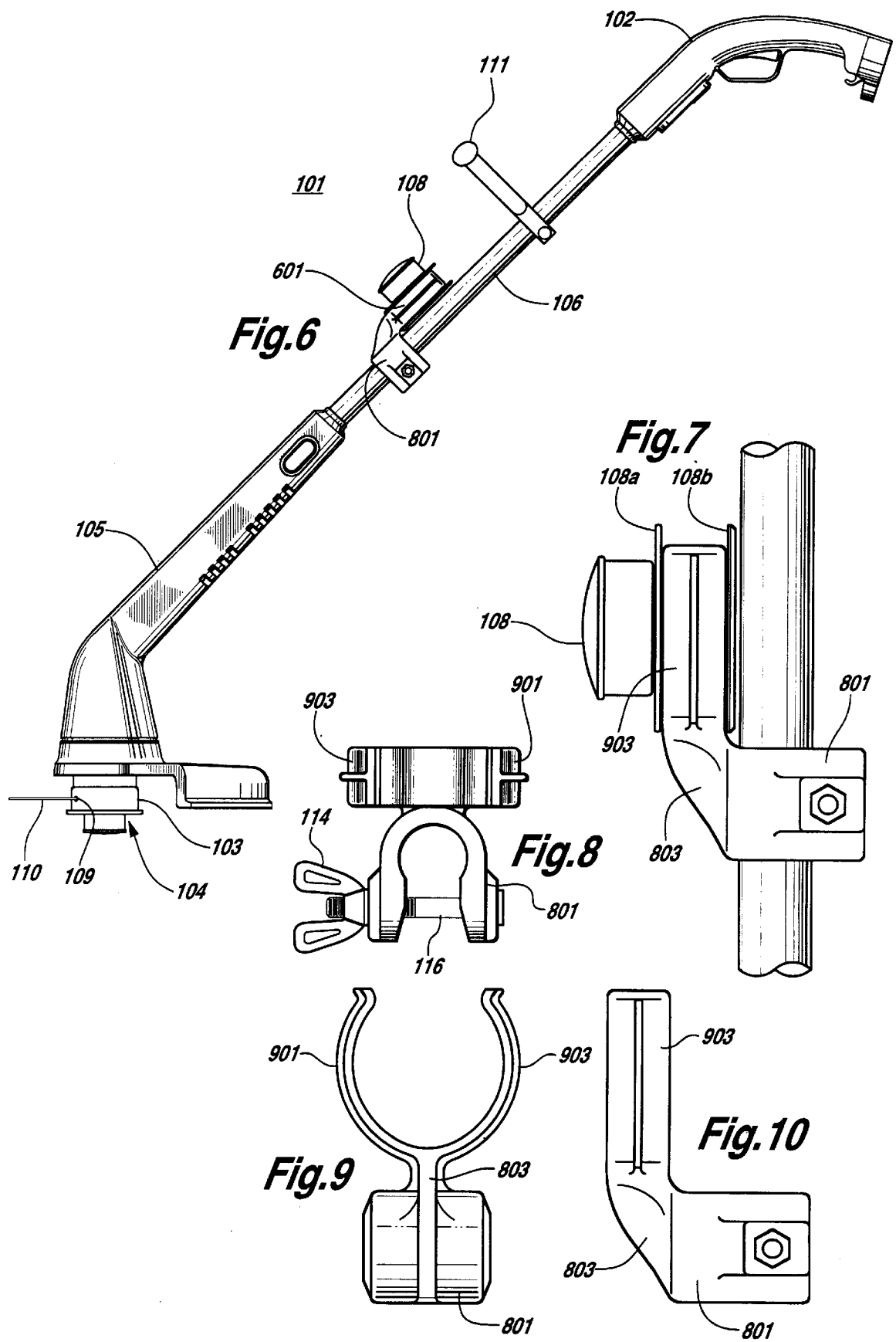

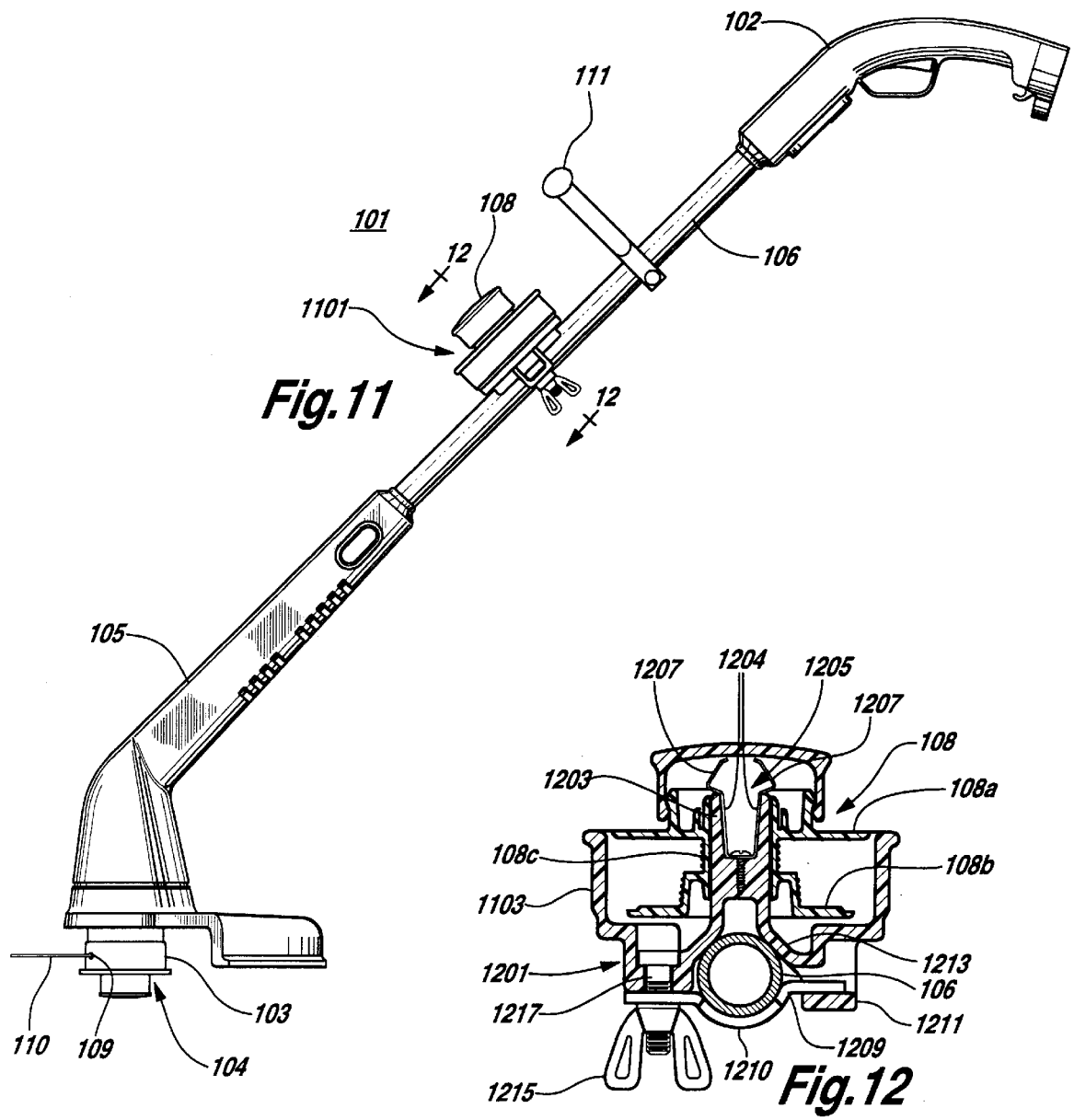
Fig. 11
Fig. 12
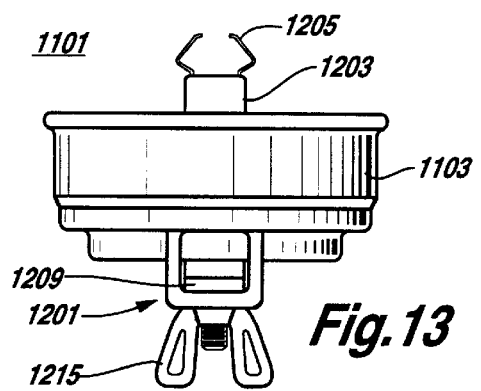
Fig. 13

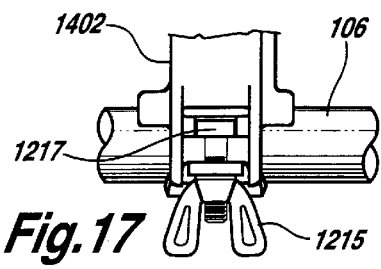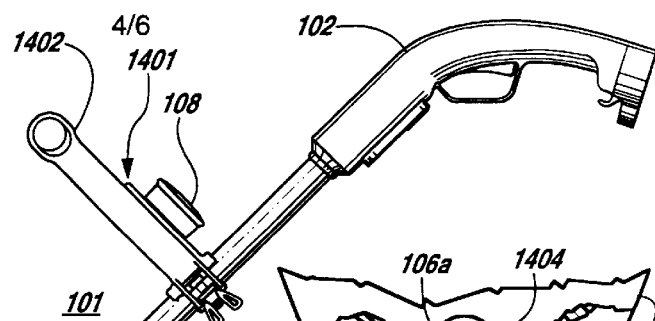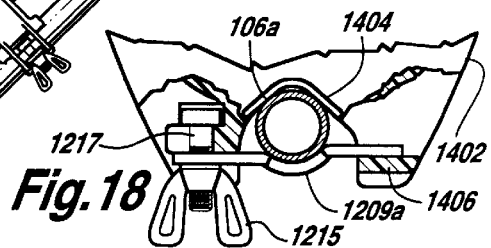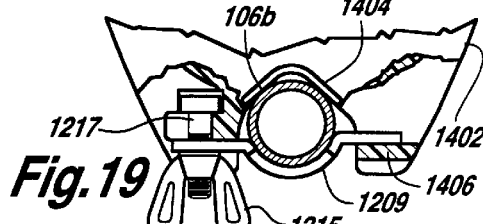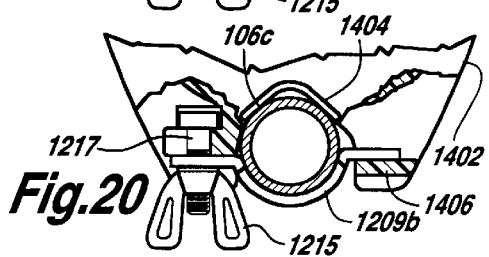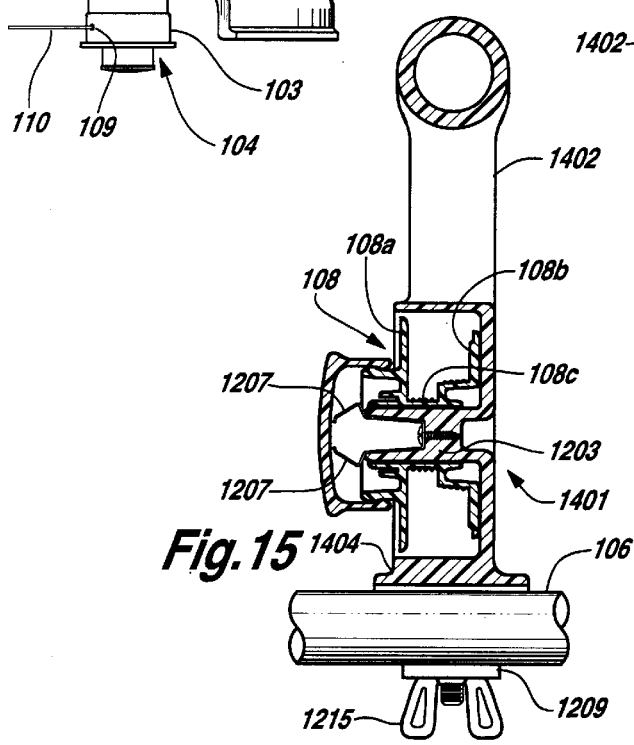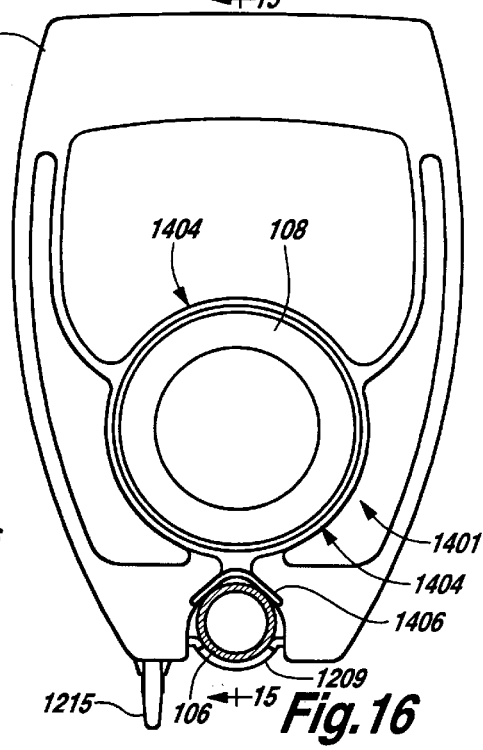

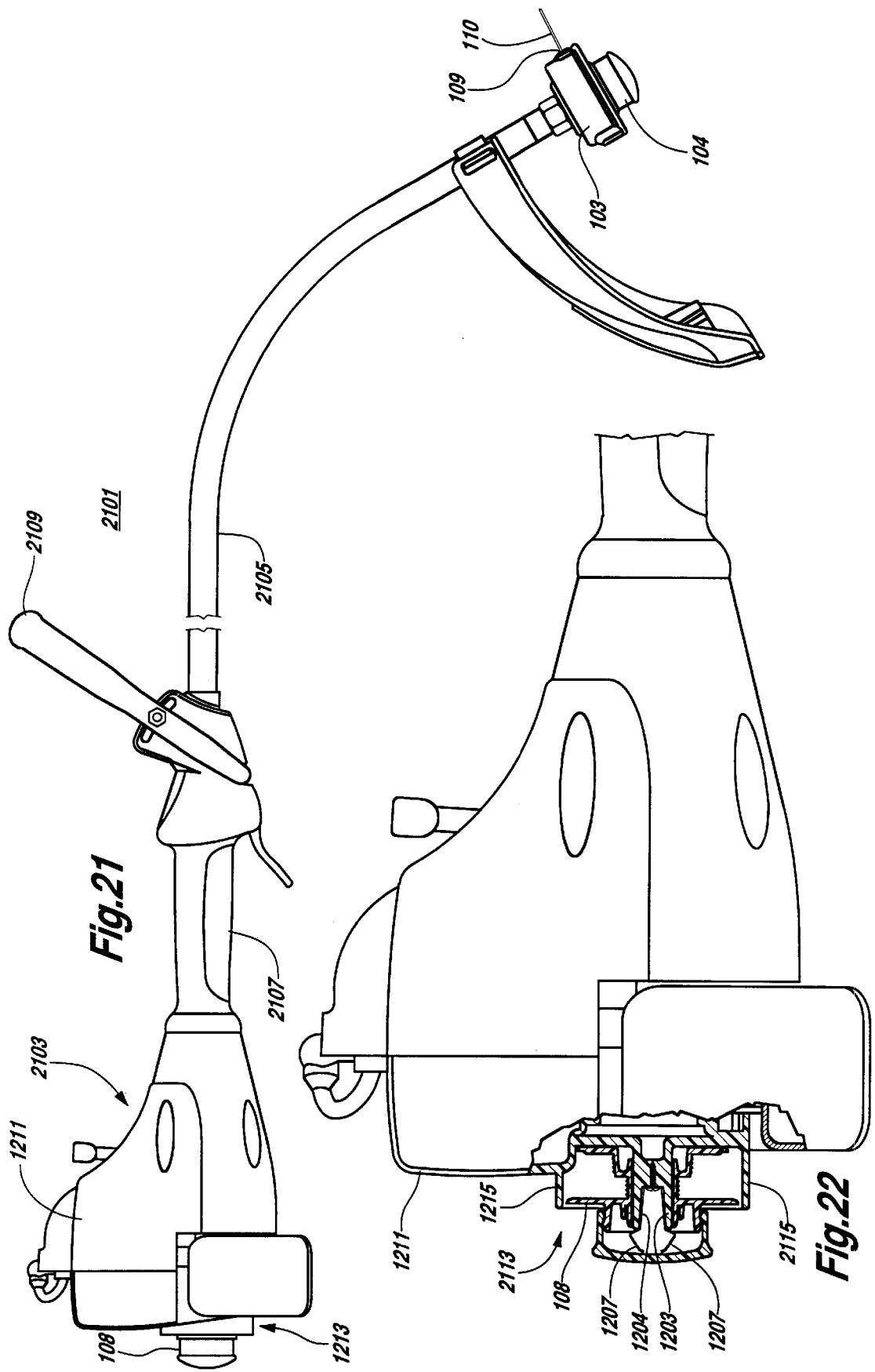

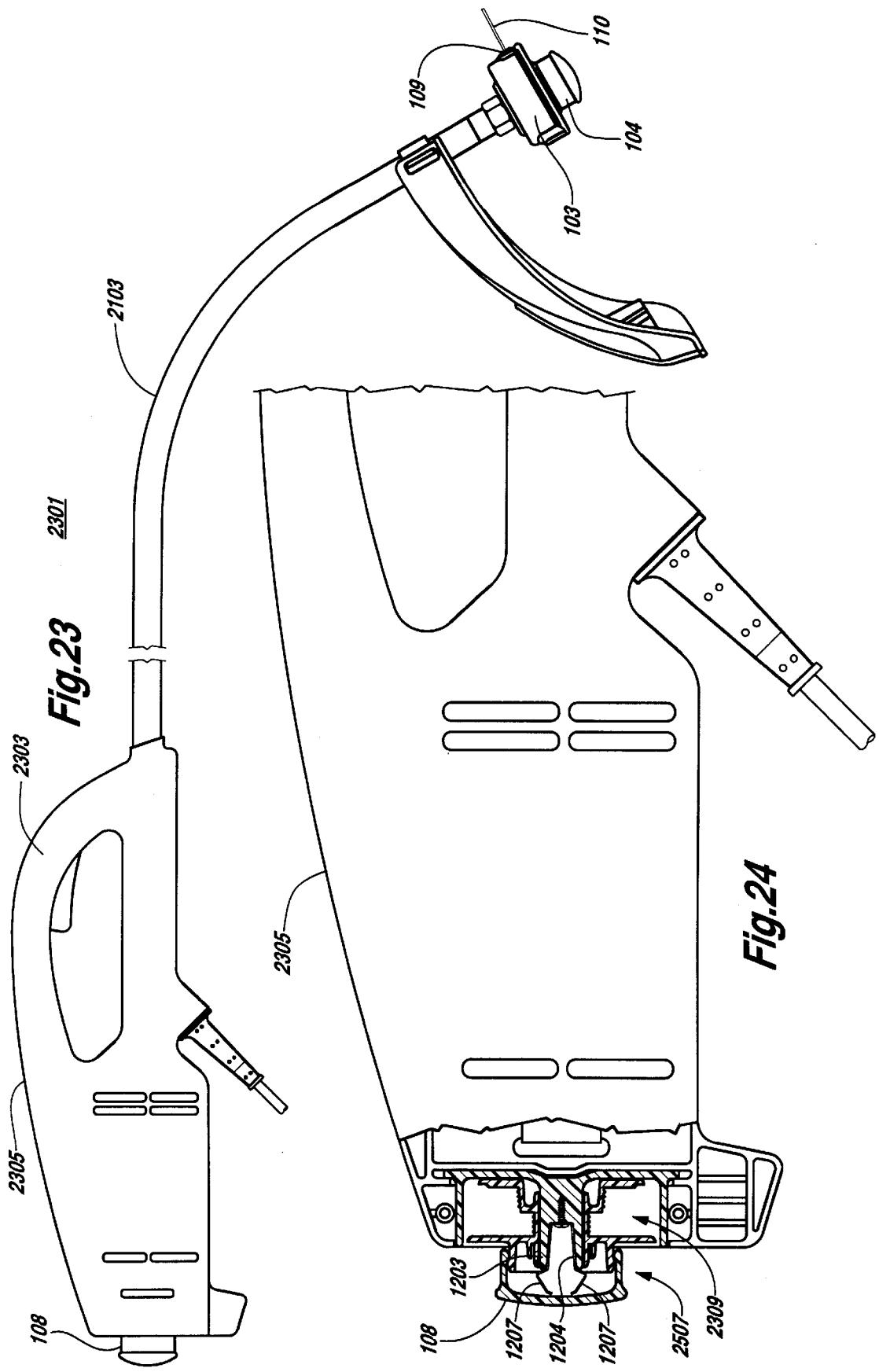

APPARATUS FOR CARRYING SPARE LINE SPOOL ON FLEXIBLE LINE TRIMMER

TECHNICAL FIELD OF THE INVENTION

The invention relates to vegetation trimmers utilizing flexible line for cutting.

BACKGROUND OF THE INVENTION

Vegetation trimmers employing a length of flexible line as a flail slung rapidly about an axis to provide a cutting element are well known in the art as an alternative to bladed trimmers. These so-called flexible line trimmers all possess a prime mover, typically an internal combustion engine or electric motor, which provides the rotation for rapidly slinging the flexible cutting line. However, such trimmers may assume numerous configurations.

Typically, flexible line trimmers are manually carried by their users so that they can be easily maneuvered close to vegetation which cannot be cut using conventional mowers. However, when the prime mover is powerful, and thus heavy, flexible line trimmers can be fitted with wheels for rolling the trimmer. Since most users will be standing while cutting vegetation and vegetation is usually near the ground, such flexible trimmers normally possess an elongated structure for carrying handles which enable a user, while standing, to position the rotating flail near the ground. However, some flexible line trimmers intended for light duty may not possess such a structure. The elongated handle support structure is typically a wand or other single, narrow elongated structure such as a hollow tube. On a lower end of the elongated handle support is a rotating line head for holding the flail as it is being rapidly slung. Towards the upper end is mounted one or two handles for gripping. The line head is rotationally driven by a prime mover located either at the lower or upper end of the elongated handle support. The prime mover is usually partially or completely covered or enclosed by a shroud or housing, which may also serve to mount the prime mover to the elongated handle support. This shroud or housing usually performs several functions, such as keeping dust and other debris from sensitive parts of the prime mover and directing or channeling air across the prime mover to cool it.

Flexible cutting line is easily worn or broken by use. The flail or length of flexible line which extends radially outwardly from the line head must therefore be frequently replaced during use of the trimmer. Although there many types or configurations of line heads, many provide a housing for receiving a spool or reel wound with a supply of flexible cutting line which can be paid out to replace the flail as it is becomes worn or broken. In most such line heads, a free end of the flexible line wound on the spool is fed through an opening or aperture in the housing and the spool is held for rotation with the housing. To feed line, the spool and the aperture in the line head housing are permitted to rotate relative to each other, thus paying out line through the aperture. There are a number of well-known types of mechanisms which are used for controlling the rotation of the spool relative to the aperture in order to pay out line. However, in all line heads there is a practical limit to the amount of line which can be wound on the spool and carried by the line head. When line is depleted from the spool, the user must remove the spool and rewind it with flexible cutting line from a bulk supply, or replace the depleted spool with another spool already wound with line.

SUMMARY OF THE INVENTION

The invention pertains to apparatus for carrying a spare spool, prewound with flexible line, on a flexible line trimmer.

During extended or heavy-duty trimming operations, it is possible for a spool in a line head of a flexible line trimmer to be depleted of line before completion of the trimming operation. Furthermore, line heads usually do not provide a way of easily assessing the amount of line remaining on the spool within the line head, the housing of the line head typically completely blocking view of the spool. Thus, many users may be unaware of how little line is left on a spool before commencing operation and thus quickly deplete the supply of cutting line on the spool. Running out of cutting line is an inconvenience, requiring the user to stop trimming and either wind a new supply of line onto the spool or replace a depleted spool with a prewound spool. It can be a substantial inconvenience if the user is not well organized and cannot locate the bulk supply of flexible cutting line or spool in his or her garage, storage shed or utility room, or if the bulk supply or spool has been lost or misplaced. Indeed, the user may have failed to anticipate running out of line, thus necessitating a trip to a neighbor or store to obtain additional line.

An apparatus according to the present invention which enables attaching, in addition to a spool which is operatively connected for paying out cutting line, an additional spool to a flexible line trimmer provides a means for solving these problems. A prewound spool connected to the trimmer is immediately available for replacing the spool for paying out line to the line head, thus potentially reducing downtime during trimming operations in the event the supply of line from the operative spool is depleted. It further provides a convenient location to store an extra spool, thus reducing the possibility that it will be lost or misplaced. Replacing a spent spool with the spare spool may also remind the user that it may be time to acquire additional line. By providing a means for attaching the spare spool in a location on the trimmer which can be easily viewed, a spent spool can serve as a visual reminder that additional cutting line may be soon needed.

Several different embodiments of a means for attaching or removably connecting a spare spool to a flexible line trimmer are disclosed herein. In addition to serving as examples of such means for attaching, these embodiments further illustrate additional inventive aspects and advantages. For example, in accordance with one such aspect, the means for removably connecting a spare spool includes means for enabling quick connection or release of a spool in a single movement, without having to first release separate fasteners. The means for removably connecting a spare spool may be attached to a trimmer's elongated handle support structure, enabling it to be easily retrofit to existing trimmers. However, according to another aspect, the means for removably connecting a spare spool is integrally formed with a housing or shroud for the trimmer's prime mover, the shroud or housing providing an out-of-the-way connection location and protecting the spool from accidentally being dislodged. Additionally, according to yet another inventive aspect of the illustrated embodiments, a bail shaped assist handle, normally attached to an elongated handle support of a flexible line trimmer which is carried by a user, may include the means for removably connecting a spare spool to the trimmer, again in a location which tends not to be in the way of normal trimmer use or which would tend to subject the spool to accidental dislodgement. The same assist handle can then be fitted or retrofitted to a wide range of trimmers with elongated shafts without substantial modification.

The foregoing is intended only to briefly describe some of the inventive features and technical advantages of the illustrated embodiments. It is not intended in any way to limit the scope of the appended claims which define the invention.

3

BRIEF DESCRIPTION OF THE DRAWINGS

For a more complete understanding of the present invention, and the advantages thereof, reference is now made to the following description of a preferred embodiment for the invention taken in conjunction with the accompanying drawings, in which:

FIG. 1 a side view of a portable flexible line trimmer having a spare spool carried by a spare spool connector in the form of a bracket mounted on a handle support tube of the trimmer capable of holding spools of different diameters.

FIG. 2 is a right side view of the spare spool storage bracket of FIG. 1.

FIG. 3 is a top view of the spare spool storage bracket of FIG. 1.

FIG. 4 is a bottom view of the spare spool storage bracket of FIG. 1

FIG. 5 is a left side view of the spare spool storage bracket of FIG. 1 section along line 5—5 indicated in FIG. 4.

FIG. 6 is a side view of a portable flexible line trimmer having a second embodiment of a spare spool connector in the form of a spare spool storage bracket mounted on a handle support tube of the trimmer.

FIG. 7 is a left side view of a spare spool storage bracket of FIG. 6.

FIG. 8 is a top view of the spare spool storage bracket of FIG. 6.

FIG. 9 is a front view of the spare spool storage bracket of FIG. 6.

FIG. 10 is a left side view of the spare spool storage bracket of FIG. 6.

FIG. 11 is a left side view of a portable flexible line trimmer having a third embodiment of a spare spool connector mounted on a handle support tube of the trimmer.

FIG. 12 is a section of the spare spool connector of FIG. 11 sectioned along line 12—12 indicated in FIG. 11.

FIG. 13 is a left side view of the spare spool connector of FIG. 11 without a spare spool received therein.

FIG. 14 is a side view of a portable flexible line trimmer having a spare spool connector included with a bail shaped assist handle of the trimmer.

FIG. 15 is a right side view of the spare spool connector of FIG. 14 sectioned along line 15—15 in FIG. 16.

FIG. 16 is a top view of the spare spool connector of FIG. 14.

FIG. 17 is a left side view of the spare spool connector of FIG. 14.

FIGS. 18, 19 and 20 are partial sections of a clamp portion of the assist handle of FIG. 14 illustrating it clamped to handle support tubes of different diameters.

FIG. 21 is a side view of a flexible line trimmer having a spare spool connector integrally formed in a shroud for an internal combustion engine which powers the trimmer.

FIG. 22 is a partial side view of the flexible line trimmer of FIG. 21 with a portion of the shroud and spare spool connector sectioned.

FIG. 23 is a side view of a flexible line trimmer having a spare spool connector integrally formed in the housing for an electric motor.

FIG. 24 is a side view of the flexible line trimmer of FIG. 23 with a portion of the housing and spare spool connector sectioned.

DETAILED DESCRIPTION OF THE INVENTION

Like numbers refer to like parts throughout.

Referring to FIGS. 1–5, except for a spare spool connector in the form of spool storage bracket 107 for carrying spare line spool 108, flexible line trimmer 101 is representative of a conventional flexible line trimmer. It includes a main handle 102 and a bail shaped assist handle 111 mounted by a clamp on an upper end of an elongated handle support tube 106, and a prime mover in the form of an electric motor (not visible) mounted within a motor housing 105 supported on a lower end of the handle support tube. A line head 103 is coupled to the drive shaft of the prime mover for rotation. Within the line head is operatively mounted a spool 104 wound with flexible cutting line to be paid out during operation of the line head. Although not shown in these figures, the construction of the spool includes a hub around which line is wrapped between two flanges extending radially from opposite ends of the hub. The hub is hollow so that it can be mounted and spun on a hub or post within the line head. The free end of the cutting line wound on the spool extends through an aperture 109 defined in the line head, thereby forming flail 110.

Spool storage bracket 107 includes a clamp portion 112 for attaching the bracket to a tubular structure such as the elongated handle support tube 106. The arms 112a and 112b the clamp are somewhat bendable and resilient and are pulled together by tightening wing nut 114 on bolt 116. A saddle 118 formed in the clamp enhances fore-aft lateral stability of the bracket 107 when mounted. The bracket 107 includes two opposing curved arms 201 and 202 which together define a "C" shape for receiving the spare spool 108 through the opening between the tips of the arms. The bracket is made large enough to accommodate spools of different diameters, as indicated by dashed circles 120a and 120b in FIG. 2. In order to hold spools of differing diameters and differing amounts of line wound thereon, a piston-like clamp is provided having a "V" shaped foot 209 mounted on post 205 for pushing the spare spool against arm 202. Boss 203 on arm 201 has a small aperture through which the post 205 is permitted to slide axially and to twist so that the "V" shape of the foot can be oriented in either a first orientation (as shown) in which it fits between the flanges of the spool to engage the windings of cutting line or hub of the spool, or in a second orientation rotated ninety degrees with respect to the first, to act against and retain the edges of both flanges of the spool in the event the post cannot extend the foot far enough to hold the spare spool against the opposite arm when in the first orientation. The boss 203 also defines a cavity which provides a seat for coiled spring 207. The coiled spring biases the foot 209 inwardly, toward engagement with the spare spool. Knob 211 on the opposite end of the post 205 enables the post and the foot to be pulled away from the spare spool and thus enable removal or insertion of the spare spool 108 from the bracket. Lip 202a and lip 202b extending from opposite side edges of arm 202 retain the spool against lateral movement when clamped.

Storage bracket 107 may be mounted on flexible line trimmers of types different from that of line trimmer 101. As shown, the bracket may be mounted to a circular or tubular shaped element and thus can be fitted to most flexible line trimmers having an elongated handle support structure. Furthermore, the same bracket may be fitted or retrofitted to a wide range of trimmers since it can retain or connect to spare spools of different diameters.

Turning now to FIGS. 6–10, spool storage bracket 601 includes resilient left curved arm 901 and resilient right curved arm 903. Left curved arm 901 and right curved arm 903 form a substantially "C" shape bracket. The end of each arm is curved outwardly to assist in spreading apart the arms during insertion of the spool. The arms are deflected outwardly as the spare spool is being inserted or removed. In a relaxed or unstressed state, the arms are bent or angled slightly inwardly from the base and do not define a perfectly circular shape. This inward bias enables the arms to remain deflected slightly outwardly once the spool has been inserted, thus developing an inwardly directed force which enhances the gripping of the spare spool by the bracket. Also, it helps the bracket retain a spare spool on which less than a full complement of line has been wound.

The arms are shown to fit between the flanges 108a and 108b of the spare spool. However, the bracket could instead grip the outer edges of the flanges of the spare spool, in which case the arms could also be modified to include lips extending inwardly from the side edges of the arms of the bracket, substantially in the manner shown in FIGS. 1–5, to prevent the spare spool from slipping out of the bracket.

Storage bracket 601 is clamped to support tube 106 in a manner similar to clamp 112 depicted in FIGS. 1–5 using clamp portion 801. Stem 803 connects the clamp portion to the storage bracket, allowing the spool to be stored flat against support tube 106 with a lower overall profile which tends to reduce the chance that the spare spool will be accidentally dislodged.

Turning now to FIGS. 11–13, spool connector 1101 includes lower clamp section 1201 for clamping the connector to support tube 106 and a cup-shaped housing section 1103 defining a compartment or receptacle in which spare spool 108 is received and mounted on central post 1203. The central post has a hollow recess 1205 into which spring 1204 is fastened using a screw. Supported on the ends of legs of spring 1204 are a pair of outward protrusions 1207, each of which has two inclined or ramped surfaces, one facing upwardly or out of the receptacle, and the other facing downwardly or into the receptacle. The spring 1204 biases the protrusions outwardly beyond the sides of the post.

To connect spare line spool 108 to connector 1101, a user aligns the hollow hub section 108c of the spare spool 108 with the central post 1203 and moves it downwardly. The edge of hub 108c contacts upper ramped surfaces of protrusions 1207. As spare line spool 108 is moved toward the central post, protrusions are moved inwardly and the legs of spring 1204 deflect inwardly against their bias, thus allowing spare spool 108 to slip over the central post 1203. Further moving of spare spool 108 completely into the housing 1103 allows protrusions to extend outwardly on the other side of the spare spool 108 under the urging of the spring 1204 and thereby hold line spool 108 on the post 1203. Thus, the spare spool is secured to the central post of the connector in a single movement, without the need to release separate fasteners. When spare line spool 108 is needed, it is pulled off the central post in a manner similar to that used to connect it. Manually moving the spare spool upwardly on the central post causes the hub of the spare spool to engage the lower ramped surfaces of the protrusions 1207 and to thereby deflect the protrusions inwardly, allowing the spare spool 108 to be removed from the post. Connector 1101 is clamped to support tube 106 by inserting the free end of clamp plate 1209 on shelf 1202 and then moving the plate toward and against the tube by tightening wingnut on bolt 1217, which extends through a hold in clamp plate 1209. The tube is held by saddle 1213 and by curved saddle section 1210 of plate 1209. The housing 1103 protects the spare spool from dirt and debris and accidental unwinding, but primarily from accidental dislodgement due to bumping it against other objects and the like.

Turning now to FIGS. 14–17, assist handle 1402 of flexible line trimmer 101 has incorporated therein a spare spool connector 1401. Connector 1401, like connector 1101, includes a central post 1203, a hollow recess 1205, a spring 1204 and outward protrusions 1207. Spare spool 108 is connected and disconnected to connector 1401 in the same manner as it is connected and disconnected from connector 1101. Wall 1404 defines a receptacle which protects the spare spool against accidental dislodgement.

Referring to FIGS. 15–20, assist handle 1402 includes a clamping portion similar to clamping portion 1201 of FIGS. 11–13. The clamping portion includes a V-shaped saddle 1404 which is capable of mating to tubes of differing diameters, as illustrated by tubes 106, 106a, and 106b in FIGS. 18–20, representing a medium diameter, a small diameter and a large diameter tube, respectively. Clamping plates 1209, 1209a, and 1209b have formed thereon curved saddle sections 1210, 1210a, and 1210b, respectively, the saddle sections having a curvature to match that of the tubes against which they are clamped. One end of each of the clamping plates is a hole through which bolt 1217 extends. The other end is placed on shelf 1406 formed in handle 1402. Tightening wingnut 1215 moves the plate toward the hub. Shelf 1406 acts as a fulcrum on which the clamping plate pivots, thus providing leverage to better enable the handle to be tightly clamped to the tube by turning the wingnut. As seen in the side view of FIG. 17, the head of the bolt 1217 may be inserted into a retention cavity formed in the handle. The same handle 1402 may, therefore, be used in different line trimmers having handle support tubes of different diameters, requiring only an easy change in the removable clamp plate, bolt and wingnut assembly.

Turning now to FIGS. 21–22, a line trimmer 2101 has prime mover 2103 in the form of an internal combustion engine (not visible), located on the upper end of handle support tube 2105, to the rear of main handle 2107 and auxiliary handle 2109. The engine is encased by shroud 2111. Spare spool 108 is attached to a connector 2113 integrally formed in shroud 2105. Connector 2113 utilizes the same post 1203, spring 1204 and protrusions 1207 as used by connector 1101, shown in FIGS. 11–13, and connector 1401, shown in FIGS. 15–20, and functions to enable connection and disconnection of the spare spool 108 in the same manner. The connector includes a compartment defined by wall 1215 which is also integrally formed with the rear panel of the engine shroud. The wall or compartment protects against the spool becoming accidentally dislodged.

Referring to FIGS. 23–24, line trimmer 2301 is substantially similar to the line trimmer 2101 of FIG. 21, except that an electric motor (not visible) is used in place of an internal combustion engine. The rear handle 2303 is integrally formed with motor housing 2305, as is a spare spool connector 2307. Connector 2307 includes a compartment 2309 formed in and by the rear panel or portion of the motor housing for protecting the spool against accidental dislodgement. The connector also utilizes the same post 1203, spring 1204, and protrusions 1207 as connector 1101, shown in FIGS. 11–13, connector 1401, shown in FIGS. 15–20 and connector 2107, shown in FIGS. 21–22, to retain the spool and thus functions in the same manner.

The invention has been described in reference to a portable flexible line trimmer having an elongated handle support shaft. Although the invention has particular advantages when used with this type of flexible line trimmers, it is need not be necessarily limited to use in connection with flexible line trimmers of this type. Furthermore, the forgoing embodiments are intended to illustrate the invention and its advantages. However, various changes, substitutions and alterations could be made to such embodiments without departing from spirit and scope of invention as defined by appended claims.

What is claimed is:

1. A flexible line trimmer, comprising:
 a line head for rapidly slinging a flail of flexible line, and a first, replaceable spool wound with cutting line operatively coupled to the line head for paying out flexible line to replace the flail when worn;
 a prime mover operatively coupled with the line head;
 a second spool having a substantially similar size and shape as the first spool for replacing the first spool in the line head; and
 means for connecting said second spool to the trimmer solely for non-operative storage at a location remote from and not operatively coupled with the line head.

2. The flexible line trimmer of claim 1 wherein the means for connecting includes a housing defining a cavity for receiving the second spool and a post on which the second spool is mounted.

3. The flexible line trimmer of claim 2 further comprising:
 an elongated handle support; and
 a handle mounted on the elongated handle support;
 wherein the housing of the means for connecting is defined within the handle.

4. The flexible line trimmer of claim 1 wherein the means for connecting includes a bracket having first and second prongs, and wherein the second spool is held between the first and the second prongs.

5. The flexible line trimmer of claim 4 wherein the bracket includes a clamp extending from the first prong for holding the second spool with different amounts of cutting line wound thereon.

6. The flexible line trimmer of claim 1 further comprising:
 an elongated handle support, the line head operatively disposed at a first end thereof and the prime mover operatively disposed at a second end thereof opposite the first end; and
 a housing for the prime mover;
 wherein means for connecting includes a cavity defined in the housing for receiving the second spool.

7. A method of operating a flexible line trimmer, the flexible line trimmer having a rotating line head operatively coupled to a prime mover and a means for connecting a spool at a location remote from line head, the line head including a first, replaceable spool; the method comprising:
 connecting a second spool wound with line to the means for connecting, the second spool having substantially the same dimensions as the first spool;
 removing the first spool from the line head when substantially depleted of cutting line;
 disconnecting the second spool from the means for connecting; and inserting the second spool into the line head.

8. The flexible line trimmer of claim 2 further including a post extending into the cavity on which the second spool is mounted.

9. A flexible line trimmer, comprising:
 a line head for rapidly slinging a flail of flexible line;
 a first, replaceable spool wound with cutting line operatively coupled to the line head for paying out flexible line to replace the flail when worn;
 a prime mover operatively coupled with the line head;
 an elongated handle support to which is operatively mounted, at one end, the line head, and to which is mounted at an opposite end a main handle;
 an auxiliary handle member mounted on the elongated handle support between the main handle and the line head;
 a second spool having a substantially similar size and shape as the first spool for replacing the first spool in the line head; and
 a post defined on the auxiliary handle member on which the second spool is mounted solely for non-operative storage.

10. The flexible line trimmer of claim 9 wherein a portion of the auxiliary handle member defines a housing surrounding the second spool when mounted to the post.

11. The method of claim 7 wherein the means for connecting includes a portion defining a cavity for receiving the second spool and a post located within the cavity on which the second spool is mounted.

12. The method of claim 11 wherein the trimmer includes an elongated handle support and a main handle mounted to one end of the elongated handle support, the line head being operatively mounted to an opposite end of the elongated support; and
 wherein the cavity of the means for connecting is defined within a portion of an auxiliary handle member mounted to the elongated support between the main handle and the line head.

13. The method of claim 7 wherein the means for connecting includes a bracket having first and second prongs, and wherein the second spool is held between the first and the second prongs.

14. The method claim 13 wherein the bracket includes a clamp extending from the first prong for retaining the spool on the bracket.

15. The method of claim 7 wherein the line trimmer includes an elongated handle support, the line head being operatively disposed at a first end thereof and the prime mover being operatively disposed at a second end thereof which is opposite the first end; and
 wherein the means for connecting includes a cavity defined in a housing for the prime mover and a post within the cavity on which the second spool is mounted.

* * * * *